(12) United States Patent
Sugiyama et al.

(10) Patent No.: US 11,621,435 B2
(45) Date of Patent: Apr. 4, 2023

(54) BATTERY PACK AND MANUFACTURING METHOD FOR BATTERY PACK

(71) Applicant: Toyota Jidosha Kabushiki Kaisha, Toyota (JP)

(72) Inventors: Toru Sugiyama, Okazaki (JP); Fumio Nomizo, Toyota (JP); Yutaroh Gotoh, Toyota (JP); Kenta Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 17/025,462

(22) Filed: Sep. 18, 2020

(65) Prior Publication Data
US 2021/0126278 A1    Apr. 29, 2021

(30) Foreign Application Priority Data

Oct. 29, 2019    (JP) .............................. JP2019-196116

(51) Int. Cl.
*H01M 10/04* (2006.01)
*H01M 50/20* (2021.01)
*H01M 50/209* (2021.01)
*H01M 50/264* (2021.01)

(52) U.S. Cl.
CPC ....... *H01M 10/0481* (2013.01); *H01M 50/20* (2021.01); *H01M 50/209* (2021.01); *H01M 50/264* (2021.01); *Y02E 60/10* (2013.01); *Y02P 70/50* (2015.11)

(58) Field of Classification Search
CPC ............. H01M 50/264; H01M 50/209; H01M 10/0481; H01M 50/20; Y02E 60/10; Y02P 70/50

USPC ..................................................... 429/163, 63
See application file for complete search history.

(56) References Cited

U.S. PATENT DOCUMENTS

| | | | |
|---|---|---|---|
| 2011/0151312 A1 | 6/2011 | Kim | |
| 2014/0309337 A1* | 10/2014 | Nagano | ..................... C08J 5/24 |
| | | | 523/428 |
| 2019/0198830 A1 | 6/2019 | Kawakami et al. | |
| 2019/0221795 A1 | 7/2019 | Fujishima et al. | |

FOREIGN PATENT DOCUMENTS

| | | | | |
|---|---|---|---|---|
| CN | 106397811 A | | 2/2017 | |
| DE | 10 2012 012 006 | * | 12/2013 | ............ H01M 10/04 |
| JP | H02216270 A | | 8/1990 | |
| JP | 2011-134699 A | | 7/2011 | |
| JP | 2011-255619 A | | 12/2011 | |
| JP | 2019-114477 A | | 7/2019 | |
| JP | 2019-125444 A | | 7/2019 | |
| KR | 10-1108190 B1 | | 1/2012 | |

OTHER PUBLICATIONS

English language machine translation of, Keck Volker, DE 10 2012 012 006 (A1) Dec. 19, 2013 (Year: 2013).*

* cited by examiner

*Primary Examiner* — Jonathan G Jelsma
*Assistant Examiner* — Omar M Kekia
(74) *Attorney, Agent, or Firm* — Dinsmore & Shohl LLP

(57) ABSTRACT

A battery pack includes a plurality of secondary batteries, and a binding band made of fiber reinforced plastic. The binding band has a braid member formed into a braided state with use of a plurality of bundled bodies, and a reinforcing part made of resin impregnated in the braid member. Each of the bundled bodies includes a plurality of fiber materials that have been bundled together.

13 Claims, 9 Drawing Sheets

BATTERY PACK AND MANUFACTURING METHOD FOR BATTERY PACK

CROSS-REFERENCE TO RELATED APPLICATIONS

This application claims priority to Japanese Patent Application No. 2019-196116 filed on Oct. 29, 2019, which is incorporated herein by reference in its entirety including the specification, drawings and abstract.

BACKGROUND

1. Technical Field

The disclosure relates to a battery pack and a manufacturing method for the battery pack.

2. Description of Related Art

For example, Japanese Unexamined Patent Application Publication No. 2019-114477 (JP 2019-114477 A) discloses a battery module including a plurality of laminated batteries, a pair of end plates provided such that the end plates are arranged on both sides of the cells, respectively, and a tension band that binds the batteries in a pressurized state. The tension band is made of fiber reinforced plastic. The tension band has an uneven part that is elastically deformable.

SUMMARY

With the battery module described in JP 2019-114477 A, when the uneven part is stretched to a certain extent or more as each secondary battery expands when charged, then stress concentrates in a peak portion and a valley portion of the uneven part. This can result in plastic deformation of the uneven part. In this case, when each of the secondary batteries shrinks as it is discharged, a load of binding the secondary batteries by the tension band runs short.

In order to avoid this problem, for example, the number of recesses and projections in the uneven part may be increased, or sizes of the recesses and projections may be increased. However, this causes a decrease in elastic modulus of the uneven part. Therefore, in order to obtain a required binding load from the uneven part, it is necessary to increase rigidity of the uneven part, in other words, a thickness of the uneven part, thus resulting in an increase in weight.

The disclosure provides a battery pack and a manufacturing method for the battery pack. In the battery pack, a given binding load is able to keep acting on a plurality of secondary batteries without a significant increase in weight.

A battery pack according to an aspect of the disclosure includes a plurality of secondary batteries and a binding band. The secondary batteries are arranged in line in a first direction. The binding band is made of fiber reinforced plastic and is configured to bind the secondary batteries in a state where a binding load acts on the secondary batteries towards an inner side in the first direction. The binding band includes a braid member formed in a braided state with use of a plurality of bundled bodies, and a reinforcing part made of resin impregnated in the braid member. Each of the bundled bodies includes a plurality of fiber materials that have been bundled together.

With the battery pack, when tensile force acts on the binding band due to expansion of each of the secondary batteries, the bundled bodies support each other. Therefore, stress concentration is restrained from happening in the binding band. Hence, when each of the secondary batteries expands, plastic deformation of the binding band is restrained. Thus, with the battery pack, a given binding load keeps acting on the secondary batteries.

Also, the resin of the reinforcing part may have breaking elongation equal to or greater than breaking elongation of the fiber material.

Thus, an area where the binding band is able to stretch and contract along with expansion and shrinkage of each of the secondary batteries is ensured effectively.

Further, the binding band may have a length that allows the binding band to surround the periphery of the secondary batteries, and a first end portion and a second end portion of the binding band may be joined to each other on an outer side of the secondary batteries in the first direction.

Thus, when each of the secondary batteries expands, a portion of the binding band facing the secondary batteries in a direction orthogonal to the first direction is stretched evenly. Therefore, rupture of the binding band is restrained, the rupture being caused by stress generated in the binding band when each of the secondary batteries expands.

Further, a manufacturing method for a battery pack according to another aspect of the disclosure includes a battery preparation step, a braid prepreg preparation step, and a band forming step. In the battery preparation step, a plurality of secondary batteries arranged in line in a first direction is prepared. In the braid prepreg preparation step, a braid prepreg formed into a braided state with use of a plurality of prepreg materials is prepared. In the band forming step, a binding band that binds the secondary batteries is formed by heating the braid prepreg. Each of the prepreg materials used in the braid prepreg preparation step includes a bundled body and a resin member impregnated in the bundled body. The bundled body is formed by bundling a plurality of fiber materials. In the band forming step, the braid prepreg is heated in a state where the braid prepreg is formed into such a shape that allows a binding load to act on the secondary batteries towards an inner side in the first direction, and the resin member is thus cured.

Further, the braid prepreg prepared in the braid prepreg preparation step may have a length that allows the braid prepreg to surround the periphery of the secondary batteries. In the band forming step, the braid prepreg may be heated in a state where a first end portion and a second end portion of the braid prepreg are joined to each other at a position on an outer side of the secondary batteries in the first direction.

As described above, according to this disclosure, it is possible to provide the battery pack in which the given binding load is able to keep acting on the secondary batteries without a considerable increase in weight, and the manufacturing method for the battery pack.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
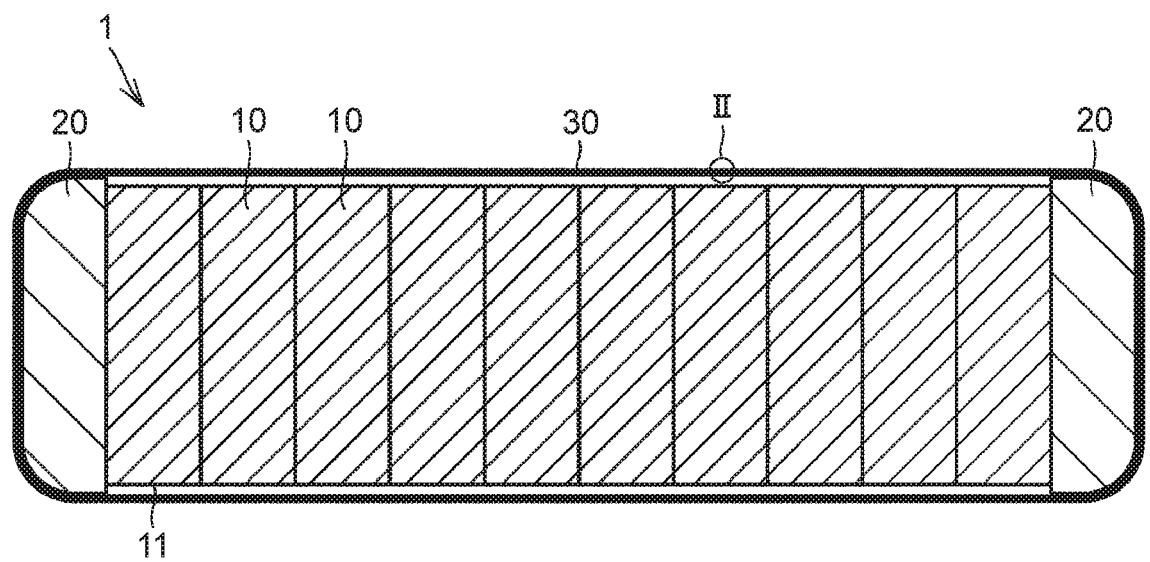
FIG. 1 is a schematic plan view of a section of a battery pack according to an embodiment of the disclosure.

An embodiment of the disclosure is described with reference to the drawings. In the drawings described below, the same reference numerals are used for the same or equivalent members, respectively.

FIG. 1 is a schematic plan view of a section of a battery pack according to an embodiment of the disclosure. The battery pack 1 is mounted on, for example, a vehicle. As shown in FIG. 1, the battery pack 1 according to the embodiment includes a plurality of secondary batteries 10, a pair of end plates 20, and a binding band 30.

The secondary batteries 10 are arranged in line in a first direction (a right-left direction in FIG. 1). Each of the secondary batteries 10 has a case body 11 formed into a rectangular parallelepiped shape. The case body 11 is formed into a flat shape. This means that the case body 11 includes first side surfaces, and second side surfaces. Each of the first side surfaces has a relatively large area, and each of the second side surfaces has an area smaller than that of the first side surface. The secondary batteries 10 are arranged so that the first side surfaces of their case bodies 11 face each other in the first direction. In other words, the case bodies 11 are arranged so that their thickness directions are in parallel to the first direction.

The end plates 20 are arranged on both ends of the secondary batteries 10 in the first direction, respectively. The end plates 20 are arranged in such a posture that a side surface of each of the end plates 20 faces the first side surface of the case body 11 in the first direction. Each of the end plates 20 is made of, for example, a metal material.

Figure 2:
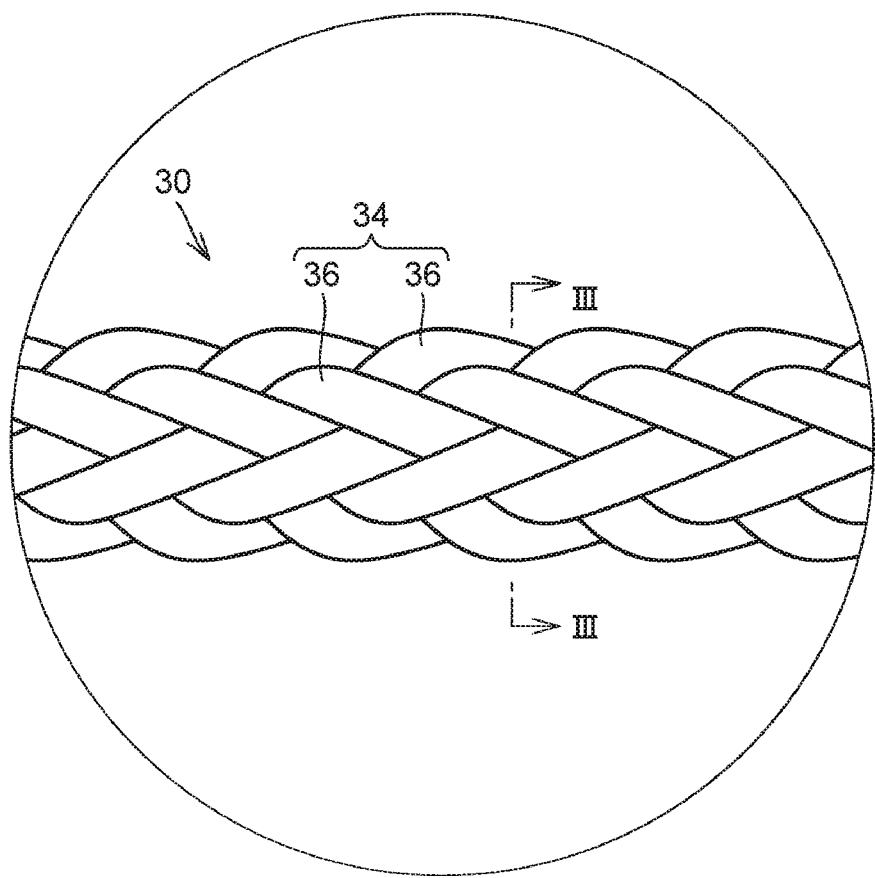
FIG. 2 is an enlarged view of a range surrounded by a solid line II in FIG. 1.
Figure 3:
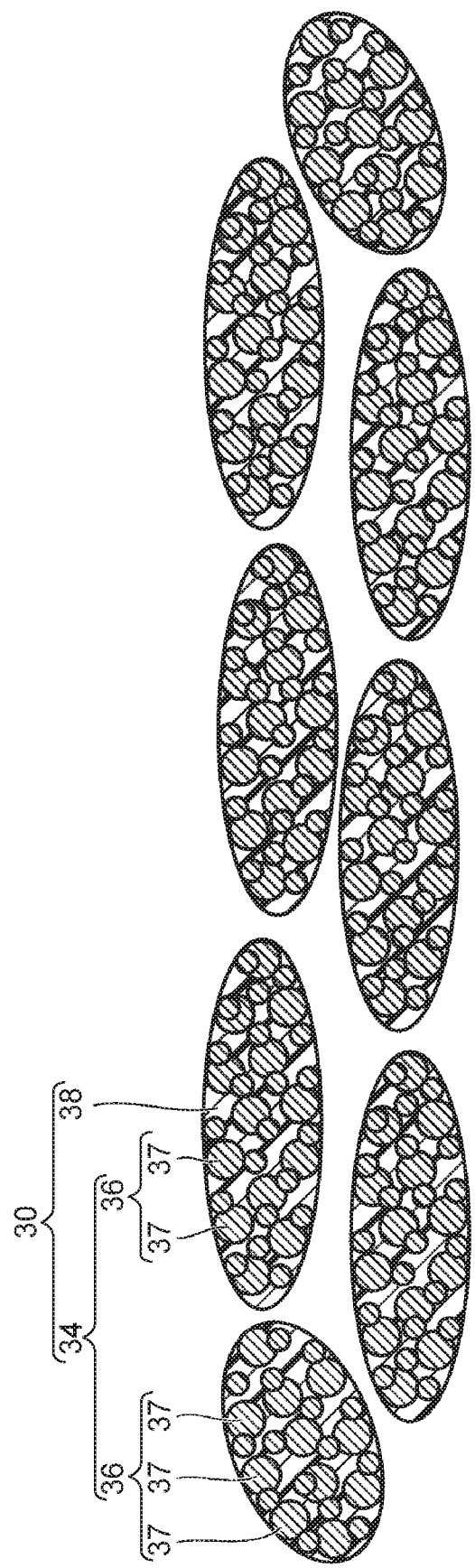
FIG. 3 is a schematic sectional view taken along the line III-III in FIG. 2.

The binding band 30 binds the secondary batteries 10 in a state where an inward binding load acts on the secondary batteries 10 in the first direction. The binding band 30 surrounds the secondary batteries 10 and the end plates 20 altogether. The binding band 30 is made of fiber reinforced plastic (FRP). In the embodiment, the binding band 30 is made of carbon fiber reinforced plastic (CFRP). As shown in FIG. 2 and FIG. 3, the binding band 30 includes a braid member 34 and a reinforcing part 38.

The braid member 34 is formed into a braided state with use of a plurality of bundled bodies 36. As shown in FIG. 3, each of the bundled bodies 36 includes a plurality of fiber materials 37 that have been bundled together. In the embodiment, each of the fiber materials 37 is made of carbon fiber.

The reinforcing part 38 is made of resin that is impregnated in the braid member 34. In some embodiments, the resin has a breaking elongation equal to or greater than a breaking elongation of the fiber materials 37, or a breaking elongation at least three times greater than that of the fiber materials 37. In some embodiments, the resin is a material that has only a little creep in response to stress generated when each of the secondary batteries 10 is fully charged. This resin may be ductile resin such as epoxy resin and aramid resin. In the embodiment, epoxy resin is used as this resin.

Figure 4:
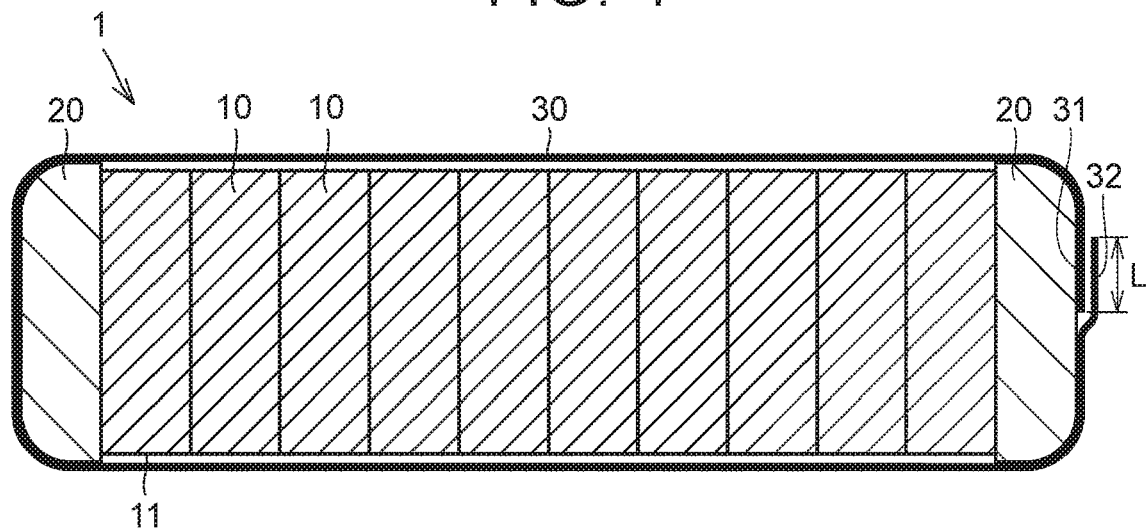
FIG. 4 is a schematic view of a joining part of a binding band.

As shown in FIG. 4, the binding band 30 has a length that allows the binding band 30 to surround the periphery of the secondary batteries 10 and the end plates 20. The binding band 30 includes and a first end portion 31 and a second end portion 32. The first end portion 31 is an end portion of the binding band 30 on a first side in a longitudinal direction, and the second end portion 32 is an end portion of the binding band 30 on a second side in the longitudinal direction. The first end portion 31 and the second end portion 32 are joined to each other on an outer side (the right side in FIG. 4) of the end plate 20 in the first direction. In some embodiments, a length L of a portion where the first end portion 31 and the second end portion 32 overlap each other may be set to be five times larger than an estimated diameter of the binding band 30, or that the length L may be at least ten times larger than the estimated diameter of the binding band 30. The estimated diameter of the binding band 30 means a diameter of the binding band 30 when a section of the binding band 30 is in a circular shape.

Figure 5:
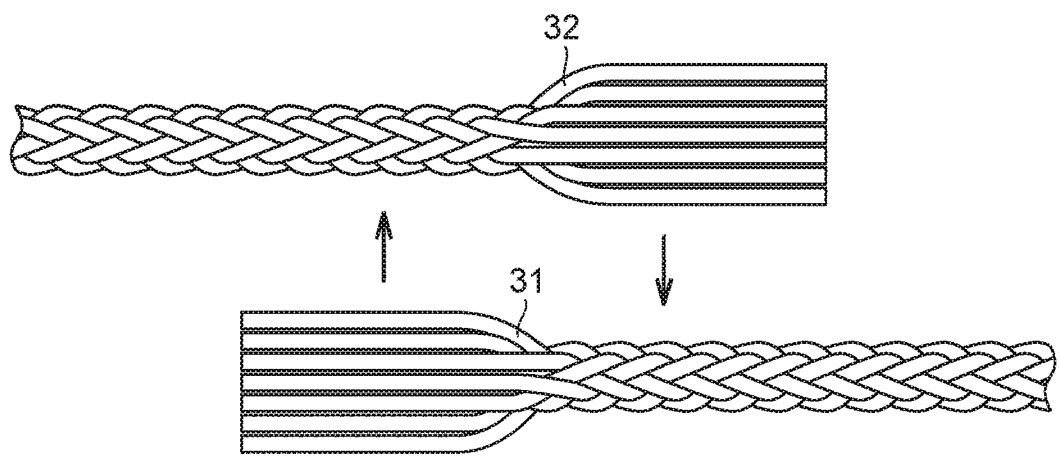
FIG. 5 is a schematic view of an example of a form in which a first end portion and a second end portion are joined to each other.
Figure 6:
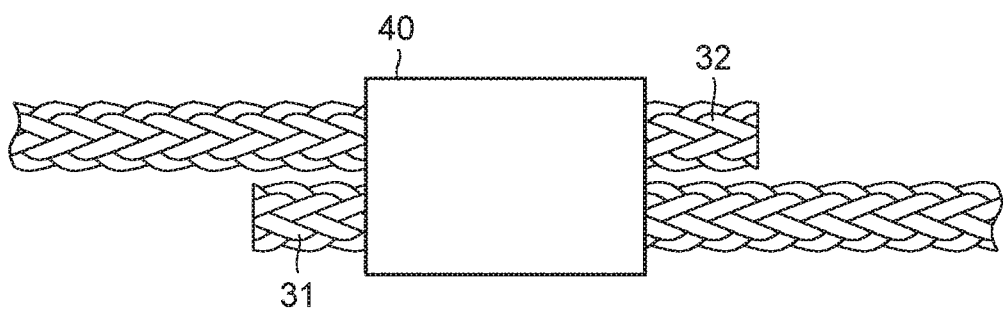
FIG. 6 is a schematic view of another example of the form in which the first end portion and the second end portion are joined to each other.

As shown in FIG. 5, an end of the first end portion 31 and an end of the second end portion 32 may be unbound, and those unbound portions may be braided together so that the first end portion 31 and the second end portion 32 are joined to each other. Also, as shown in FIG. 6, the first end portion 31 and the second end portion 32 may be fixed by a clip 40. Alternatively, the first end portion 31 and the second end portion 32 may be adhered to each other.

Figure 7:
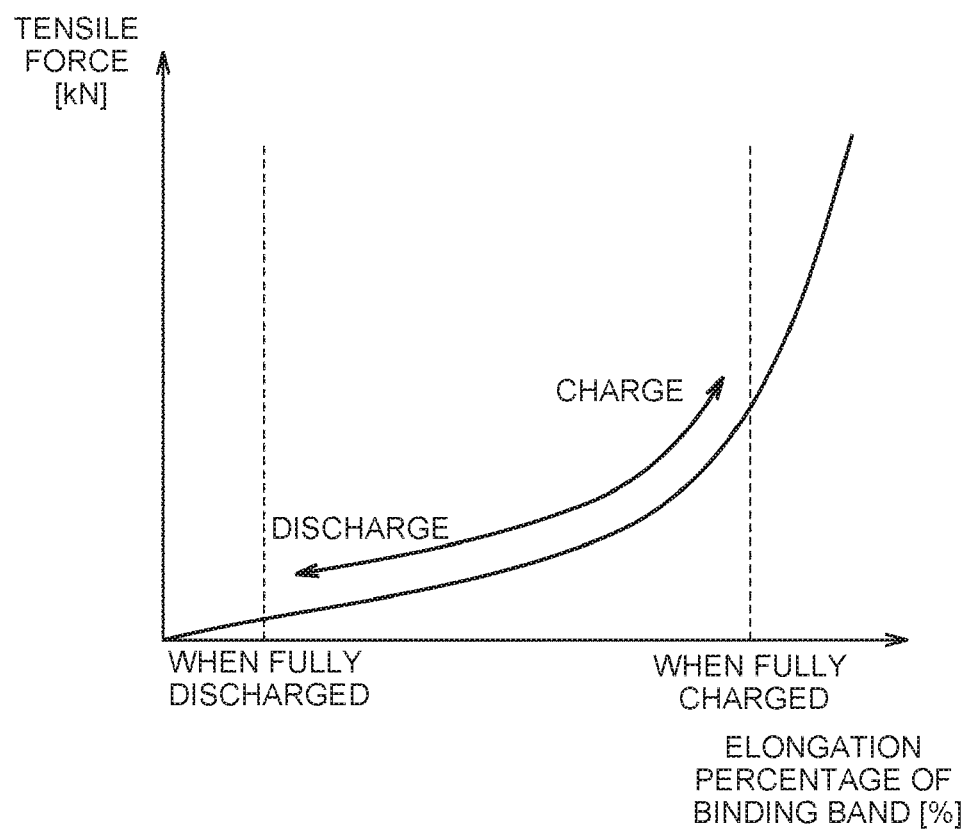
FIG. 7 is a graph showing a relation between elongation and tensile force of the binding band.

In the battery pack 1, while each of the secondary batteries 10 expands as it is charged, it shrinks as it is discharged. Therefore, as shown in FIG. 7, as each of the secondary batteries 10 nears a fully-charged state, an elongation percentage of the binding band 30 increases gradually. In turn, as each of the secondary batteries 10 nears a fully-discharged state, the elongation percentage of the binding band 30 decreases gradually.

Also, until the bundled bodies 36 in the binding band 30 support each other due to expansion of the secondary batteries 10, an increase in tensile force of the binding band 30 is relatively small with respect to an increase in the elongation percentage of the binding band 30. Meanwhile, once the bundled bodies 36 start supporting each other, then an increase in the tensile force of the binding band 30 increases rapidly with respect to an increase in the elongation percentage of the binding band 30. As shown in FIG. 7, in the embodiment, a point at which the bundled bodies 36 start supporting each other is set at timing that is slightly before the secondary batteries 10 are fully charged.

Next, a manufacturing method for the battery pack 1 is described. The manufacturing method includes a battery preparation step, a braid prepreg preparation step, a band forming step, and a battery insertion step.

In the battery preparation step, the secondary batteries 10 arranged in line along the first direction are prepared.

Figure 10:
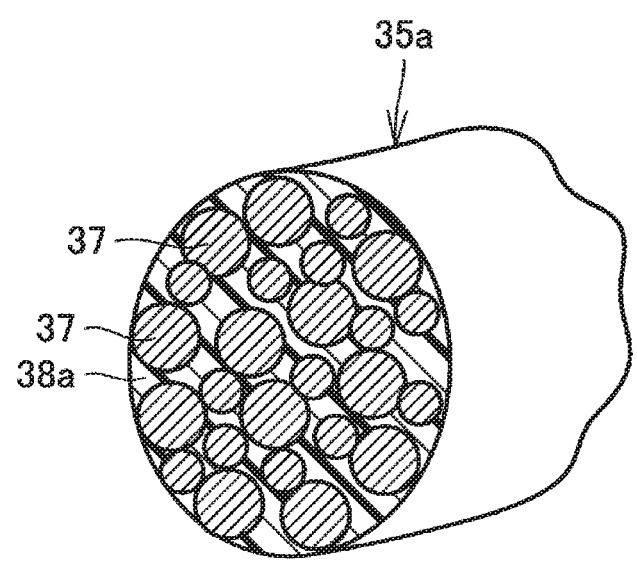
FIG. 10 is a schematic sectional view of the prepreg material.

In the braid prepreg preparation step, a braid prepreg 30a (see FIG. 11, FIG. 12) is prepared. The braid prepreg 30a is formed into a braided state with use of a plurality of prepreg materials 35a (see FIG. 10). Specifically, the braid prepreg preparation step has a prepreg material forming step and a braiding step.

Figure 8:
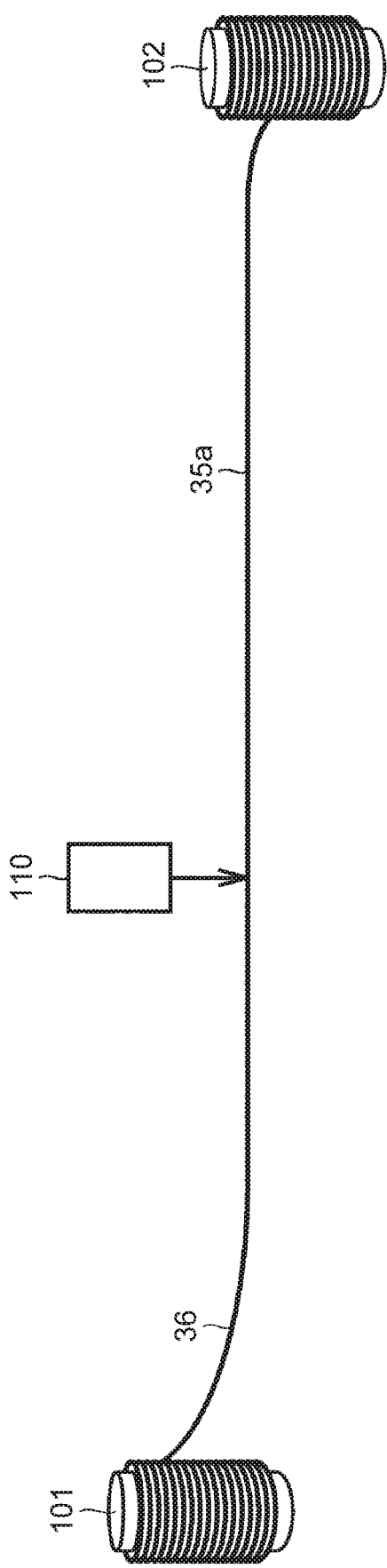
FIG. 8 is a schematic view of manufacturing steps for a prepreg material.
Figure 9:
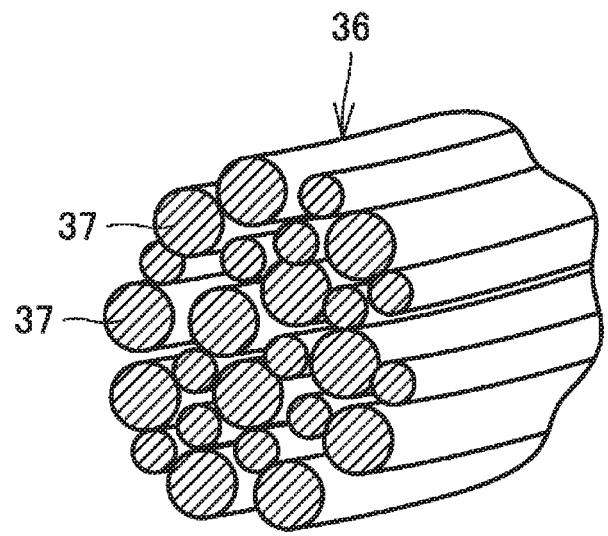
FIG. 9 is a schematic sectional view of a bundled body.

The prepreg material forming step is a step in which the prepreg material 35a is formed. The prepreg material 35a includes the bundled body 36 and a resin member 38a (see FIG. 10) impregnated in the bundled body 36. The resin member 38a is made of the foregoing resin (epoxy resin in the embodiment), and forms the reinforcing part 38 as it cures. As shown in FIG. 8, the prepreg material 35a is formed as the resin is impregnated in the bundled body 36 by an impregnator 110. The bundled body 36 is wound out from a bobbin 101. The prepreg material 35a is wound up on a bobbin 102.

The braiding step is a step in which a plurality of (in the embodiment, eight) prepreg materials 35a is formed into the braided state, and the braid prepreg 30a is thus formed. In the braiding step, the prepreg materials 35a wound out from a plurality of bobbins 102, respectively, are formed into the braided state by a braider (not shown).

The band forming step is a step in which the binding band 30 is formed by heating the braid prepreg 30a. The band forming step includes a forming step and a curing step.

Figure 11:
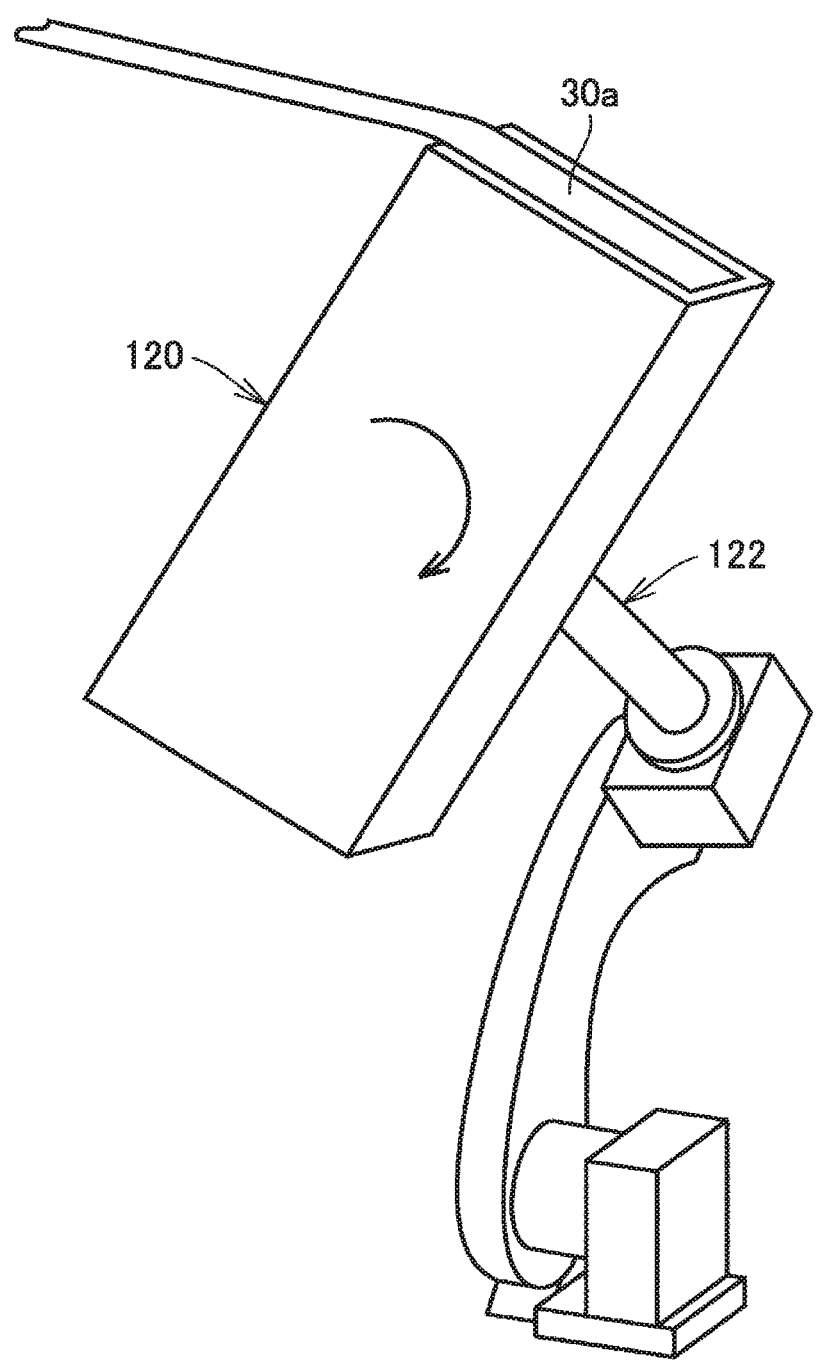
FIG. 11 is a schematic view of steps in which a braid prepreg is wound around a stacked jig.

The forming step is a step in which the braid prepreg 30a is formed into a shape so that the braid prepreg 30a surrounds a stack including the secondary batteries 10 and the end plates 20. Specifically, the braid prepreg 30a is formed so that a first end portion and a second end portion of the braid prepreg 30a overlap each other at a position on an outer side of the stack in the first direction. In this step, as shown in FIG. 11, a stacked jig 120, and a winding machine 122 are used. The stacked jig 120 has a shape similar to an external shape of the stack including the secondary batteries 10 and the end plates 20. The winding machine 122 is a device that rotates the stacked jig 120. In this step, the braid prepreg 30a is wound around the stacked jig 120 while the stacked jig 120 is being rotated by the winding machine 122.

Figure 12:
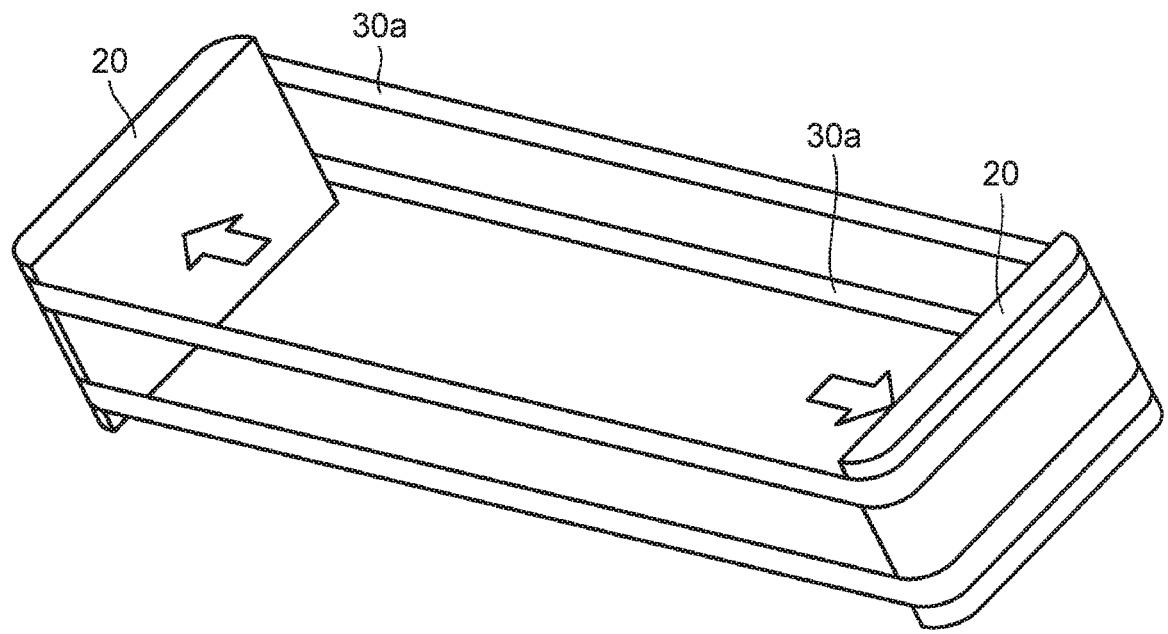
FIG. 12 is a schematic view of a state in which the braid prepreg is wound around a pair of end plates.

The curing step is a step in which the resin member 38a of the braid prepreg 30a formed in the forming step is cured, and the binding band 30 is thus formed. In this step, as shown in FIG. 12, the end plates 20 are arranged on an inner side of the braid prepreg 30a, and the braid prepreg 30a is heated in a state where given tensile force is applied to the braid prepreg 30a. For example, the braid prepreg 30a is heated for about 40 minutes to 60 minutes at 160° C. to 200° C. inside a furnace. Due to the heating, the resin member 38a is turned into the reinforcing part 38.

In the curing step, the braid prepreg 30a may be heated in a state where the end plates 20 are arranged on the inner side of the braid prepreg 30a. Alternatively, the braid prepreg 30a may be heated in a state where dedicated jigs are arranged on the inner side of the braid prepreg 30a, the dedicated jigs having shapes similar to external shapes of the end plates 20, respectively, and then the jigs may be replaced with the end plates 20.

Figure 13:
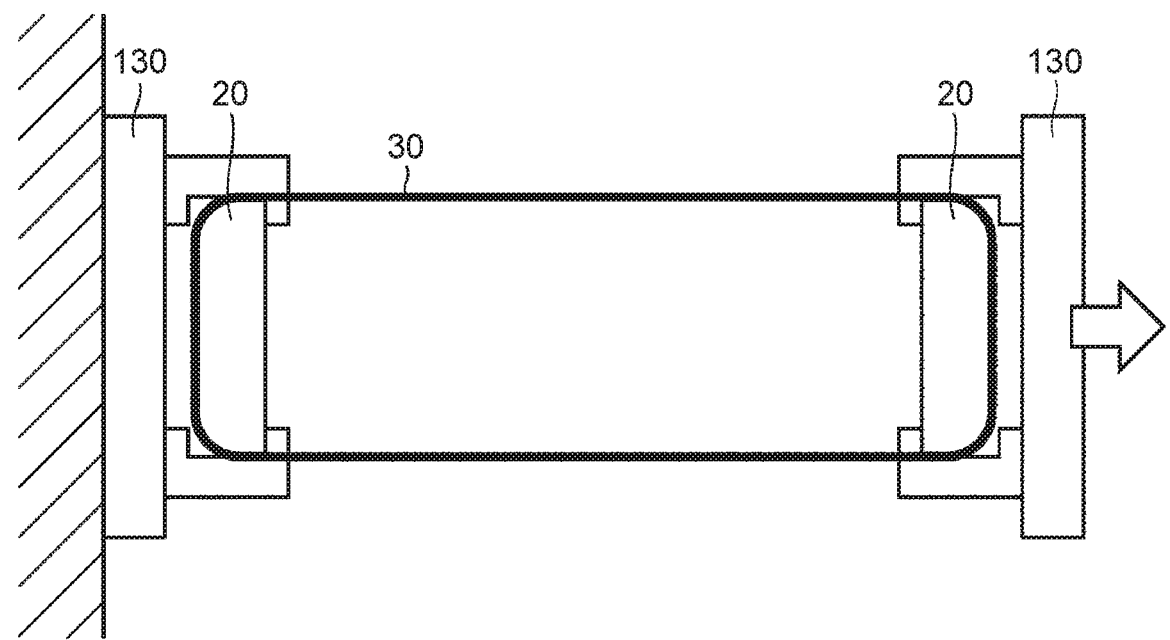
FIG. 13 is a schematic view of a state in which the binding band is pulled by a pair of pulling machines.
Figure 14:
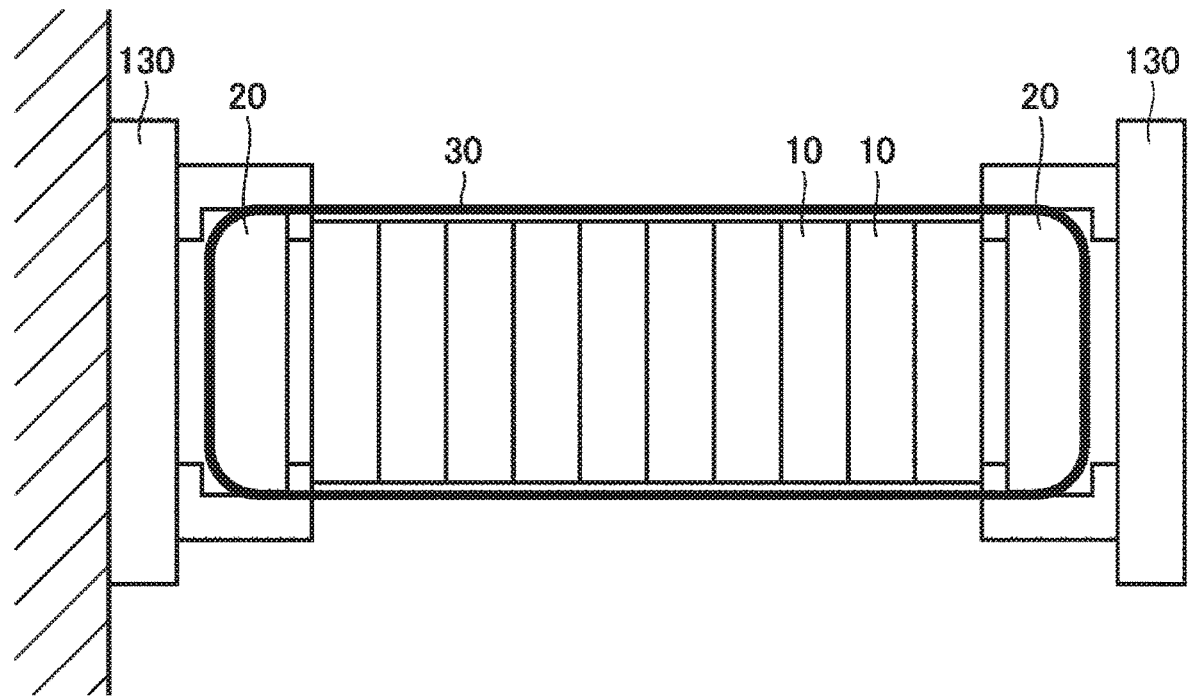
FIG. 14 is a schematic view of a state where a plurality of secondary batteries is arranged between the end plates.
Figure 15:
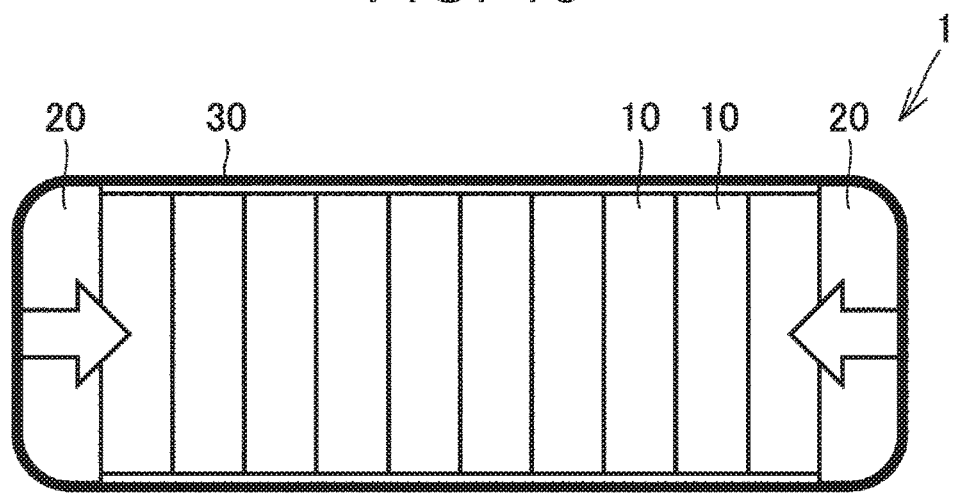
FIG. 15 is a view of a state where pulling of the end plates by the pulling machines is stopped.

In the battery insertion step, first of all, as shown in FIG. 13, pulling machines 130 pull the end plates 20, respectively, in a direction in which the end plates 20 are separated from each other (the right-left direction in FIG. 13). Thus, the binding band 30 is stretched in the direction in which the end plates 20 are separated from each other. In this state, as shown in FIG. 14, the secondary batteries 10 are inserted into the inner side of the binding band 30. After the secondary batteries 10 are inserted in the inner side of the binding band 30, the pulling machines 130 stop pulling the end plates 20. Due to this, the binding band 30 contracts. As a result, the battery pack 1 is manufactured in a state where a given binding load acts on the secondary batteries 10 as shown by arrows in FIG. 15.

As described so far, with the battery pack 1 according to the embodiment, when tensile force acts on the binding band 30 due to expansion of each of the secondary batteries 10, the bundled bodies 36 support each other. Therefore, stress concentration in the binding band 30 is restrained. Due to this, plastic deformation of the binding band 30 is restrained when each of the secondary batteries 10 expands. Therefore, regardless of a charged state of each of the secondary batteries 10, the battery pack 1 is maintained in a state where the given binding load is acting on the secondary batteries 10.

Further, with the binding band 30 according to the embodiment, a binding load larger than that of the tension band described in JP 2019-114477 A is able to act on each of the secondary batteries 10, and rupture strength of the binding band 30 is enhanced. Therefore, it is possible to reduce a weight or material cost of the binding band 30.

Further, because the first end portion 31 and the second end portion 32 of the binding band 30 are joined to each other on an outer side of the end plate 20 in the first direction, when each of the secondary batteries 10 expands, a portion of the binding band 30 facing the secondary batteries 10 in a direction orthogonal to the first direction stretches evenly. This makes it possible to restrain rupture of the binding band 30 due to stress generated in the binding band 30 when each of the secondary batteries 10 expands.

The embodiment disclosed here is just an example in every aspect, and should not be considered as a restriction. The scope of the disclosure is represented by the scope of claims instead of the description of the foregoing embodiment, and further includes all changes within an equivalent meaning and scope of the claims.

For example, the braid prepreg 30a may be formed as the braid member 34 is formed as the bundled bodies 36 are braided, and the resin is impregnated in the braid member 34. However, then, there may be some regions in the braid member 34 where the resin is not impregnated. Therefore, the braid prepreg 30a may be manufactured as described in the embodiment.

Further, the joining part of the first end portion 31 and the second end portion 32 may be set at a position facing the secondary batteries 10 in the direction orthogonal to the first direction.

What is claimed is:

1. A battery pack comprising:
a plurality of secondary batteries arranged in line in a first direction; and
a binding band that is made of fiber reinforced plastic and is configured to bind the secondary batteries in a state where a binding load acts on the secondary batteries towards an inner side in the first direction, wherein:
the binding band includes:
a braid member formed in a braided state with use of a plurality of bundled bodies; and
a reinforcing part made of resin impregnated in the braid member; and
each of the bundled bodies includes a plurality of fiber materials that have been bundled together.

2. The battery pack according to claim 1, wherein the resin of the reinforcing part has breaking elongation equal to or greater than breaking elongation of the fiber material.

3. The battery pack according to claim 1, wherein:
the binding band has a length that allows the binding band to surround a periphery of the secondary batteries; and
a first end portion and a second end portion of the binding band are joined to each other on an outer side of the secondary batteries in the first direction.

4. The battery pack according to claim 1, wherein:
a first end portion and a second end portion of the binding band are joined to each other on an outer side of an end plate; and
the end plate is disposed on an outer side of the secondary batteries in the first direction.

5. The battery pack according to claim 1, wherein:
a first end portion and a second end portion of the binding band overlap each other at a portion with a length at least five times longer than a diameter of the binding band.

6. The battery pack according to claim 1, wherein:
each of a first end portion and a second end portion of the binding band has an unbounded portion, the unbounded portions of the first end portion and the second end portion are braided together to be joined.

7. The battery pack according to claim 1, wherein each of the fiber materials is made of carbon fiber.

8. A manufacturing method for a battery pack, the method comprising:
a battery preparation step in which a plurality of secondary batteries arranged in line in a first direction is prepared;
a braid prepreg preparation step in which a braid prepreg formed into a braided state with use of a plurality of prepreg materials is prepared; and
a band forming step in which a binding band that binds the secondary batteries is formed by heating the braid prepreg, wherein:
each of the prepreg materials used in the braid prepreg preparation step includes:
a bundled body formed by bundling a plurality of fiber materials; and
a resin member impregnated in the bundled body; and
in the band forming step, the braid prepreg is heated in a state where the braid prepreg is formed into such a shape that allows a binding load to act on the secondary batteries towards an inner side in the first direction, and the resin member is thus cured.

9. The manufacturing method according to claim 8, wherein:
the braid prepreg prepared in the braid prepreg preparation step has a length that allows the braid prepreg to surround a periphery of the secondary batteries; and
in the band forming step, the braid prepreg is heated in a state where a first end portion and a second end portion of the braid prepreg are joined to each other at a position on an outer side of the secondary batteries in the first direction.

10. The manufacturing method according to claim 8, wherein:
a first end portion and a second end portion of the binding band are joined to each other on an outer side of an end plate; and
the end plate is disposed on an outer side of the secondary batteries in the first direction.

11. The manufacturing method according to claim 8, wherein:
a first end portion and a second end portion of the binding band overlap each other at a portion with a length at least five times longer than a diameter of the binding band.

12. The manufacturing method according to claim 8, wherein:
each of a first end portion and a second end portion of the binding band has an unbounded portion, the unbounded portions of the first end portion and the second end portion are braided together to be joined.

13. The manufacturing method according to claim 8, wherein each of the fiber materials is made of carbon fiber.

* * * * *